Patented July 4, 1933

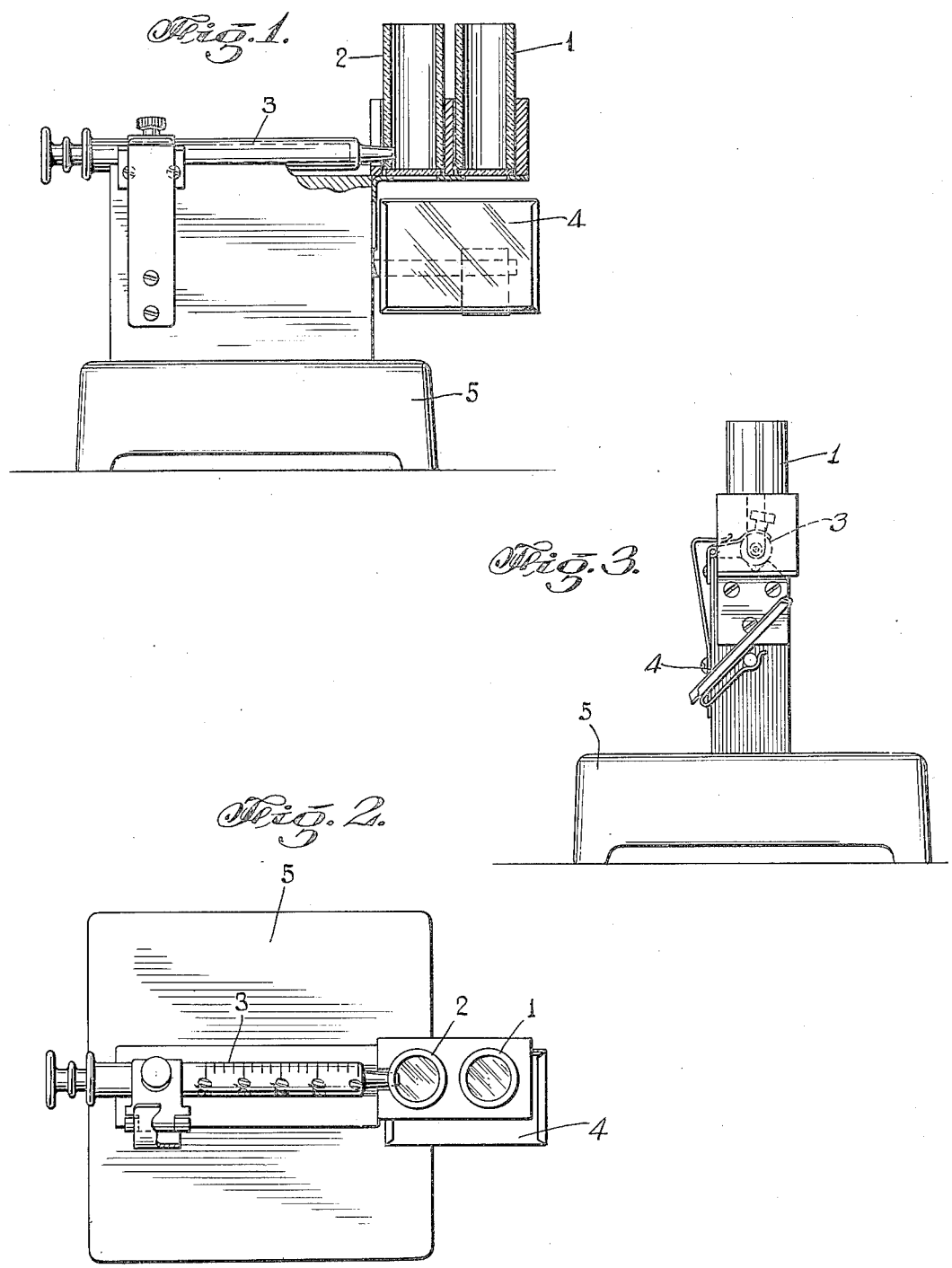

1,916,589

UNITED STATES PATENT OFFICE

ABRAHAM G. SHEFTEL, OF NEW YORK, N. Y.

COLORIMETER

Application filed February 17, 1930. Serial No. 429,073.

This invention relates to an improved colorimeter for use in determining, by a comparative color test, the quantity of a particular ingredient which may be present in a liquid specimen under examination, and is especially adapted for use by physicians and other persons in making blood analyses or the like.

All colorimeters are based on the principle that the intensity of the color of a column of colored liquid is in direct proportion to the height of the column. This principle is utilized in colorimetric analyses by comparing the color of a column of liquid to be tested with a standard color specimen, and varying the height of the column until its color is the same in shade and intensity as that of the standard specimen.

The type of colorimeters now in use have specimen containers in the form of cylindrical vessels having closed transparent bottoms and open flared upper ends through which transparent plungers pass for immersion in the specimens. The depth or height of the column to be observed, that is the portion between the bottom of the container and the lower end of the plunger, is varied by relative movement of the plungers and containers toward and away from each other. Such colorimeters are expensive to manufacture in that they embody a complicated mechanism for moving the movable parts, and require the use of carefully calibrated means for determining the extent of such movement so as to measure the depth or height of the column of liquid under observation.

It is an object of my invention to provide a device of simple and inexpensive construction which will accomplish all the results of the present type of colorimeter, but which is easier to operate and cheaper to manufacture.

My improved colorimeter, generally stated, comprises a container for the liquid to be tested, and means, such as a syringe, connected to the lower end of the container whereby liquid may be added or withdrawn to vary its level in the container and thus increase or decrease the intensity of its color as compared with a standard color specimen. I have found that the ordinary hypodermic syringe, having a transparent graduated barrel, is well suited for use in making my colorimeter. Such syringe is a stock article and can be procured at a low cost.

With the prior art colorimeter, the percentage of the ingredient under examination contained in the test specimen is determined by accurately adjusting the height of the column until its color corresponds exactly with the color of the standard color specimen, and recording the adjustment of the moving parts of the instrument required to produce a parity of color. To this end, such colorimeters are provided with mechanical means for indicating said adjustment in terms of percentage of the ingredient to be tested.

In my improved colorimeter it is unnecessary to provide any mechanism for indicating adjustments of the height of the column, and consequently the device is very much cheaper to manufacture. With my colorimeter, the percentage of the ingredient present in the test specimen is determined by measuring the quantity of liquid that must be added to or withdrawn from the test specimen in order to equalize its color with that of the standard specimen. The graduations of the syringe afford means whereby the amount that is added or withdrawn may be easily read and determined.

Other advantages of the invention will appear from the following description thereof, reference being had to the accompanying drawing, in which:—

Figure 1 is a front elevation of a colorimeter embodying my invention;

Fig. 2 is a top plan view thereof; and,

Fig. 3 is a side elevation of the device.

Referring now to the drawing, 1 and 2 indicate a pair of tubes or containers, open at the tops and having closed transparent bottoms. The tubes are supported in substantially vertical parallel relation so that an observer, viewing them from above, may look down through both tubes at the same time. The tube 1 is intended to contain a standard color specimen, used for the purpose of color comparison, which standard specimen may be either in the form of a colored liquid or in the form of a translucent or transparent solid, as is well known in the art. The tube 2 is designed to contain the specimen of colored liquid to be tested. In the case where a liquid standard of comparison is employed, it is necessary that the tubes 1 and 2 be of the same diameter.

A syringe 3, or like device, is connected to the lower end of the tube or container 2. By means of this syringe measured amounts of the same liquid may be added to or withdrawn from that contained in the tube so as to vary its level and to increase or decrease the intensity of its color in direct proportion to the amounts added or withdrawn.

A mirror or reflector 4 is mounted directly below the tubes 1 and 2 so as to reflect light upwardly through both tubes and through the specimens contained therein. The entire assembly is suitably mounted on a base 5.

The following description indicates the manner of using my improved colorimeter to determine the amount or percentage of a given ingredient which is present in the specimen to be tested. The standard color specimen, which is used for the purpose of color comparison, is placed in the tube or container 1. This standard, as is well known in the art, represents the color of a solution containing a known quantity of a given ingredient. The specimen of colored liquid to be tested is placed in tube 2 and its color is modified, by injecting or withdrawing liquid, until its shade or intensity corresponds exactly with that of the standard specimen. By simply reading on the graduations of the syringe the amount of liquid that was added or withdrawn to obtain the color parity, the amount or percentage of the ingredient present in the test specimen, in relation or proportion to that represented by the standard color specimen, may be easily determined or calculated.

While I have shown and described a preferred embodiment of the device, it is to be understood that the same may be modified without departing from the spirit or scope of the invention.

What I claim is:—

1. In a colorimeter, a container for the colored liquid specimen to be tested, a standard color specimen for comparison with the test specimen, and a graduated syringe for injecting additional quantities of the colored liquid test specimen into said container or withdrawing quantities therefrom to vary the color of the liquid test specimen until it is the same as that of the standard of comparison.

2. In a colorimeter, a container for the colored liquid specimen to be tested, said container having a transparent bottom, a standard color specimen for comparison with the test specimen, means for reflecting light upwardly through said container and standard specimen, and a graduated syringe for injecting measured quantities of the colored liquid test specimen into said container or withdrawing measured quantities therefrom to vary the color of the liquid test specimen until it is the same as that of the standard of comparison.

3. In a colorimeter, a pair of tubes of equal diameter mounted in substantially vertical parallel relation, said tubes having open tops and closed transparent bottoms, one of said tubes being adapted to contain a specimen of colored liquid to be tested and the other to contain a standard color specimen for comparison, and a graduated syringe connected to the lower end of one of the tubes for injecting additional quantities of liquid into said tube or withdrawing quantities therefrom to vary the color until it is the same as that of the liquid in the other tube.

4. In a colorimeter, a pair of tubes of equal diameter mounted in substantially vertical parallel relation, said tubes having open tops and closed transparent bottoms, one of said tubes being adapted to contain a specimen of colored liquid to be tested and the other to contain a standard color specimen for comparison, a reflector supported below said tubes for reflecting light upwardly through said tubes, and a graduated syringe connected to the lower end of one of the tubes for injecting additional quantities of liquid into said tube or withdrawing quantities therefrom to vary the color of the liquid until it is the same as that of the other specimen.

ABRAHAM G. SHEFTEL.